3,399,028
DYEING POLYESTER FIBERS WITH 3'-HYDROXY-
QUINOPHTHALONES
Hugo Illy, Toms Rivers, N.J., assignor to Toms River
Chemical Corporation, Toms River, N.J., a corporation of Delaware
No Drawing. Original application May 17, 1963, Ser. No. 281,359. Divided and this application Sept. 28, 1966, Ser. No. 615,274
8 Claims. (Cl. 8—55)

ABSTRACT OF THE DISCLOSURE

Polyester fibers and blends thereof with cotton are dyed or printed with 3,4,5,6 - tetrachloro - 3' - hydroxyquinopthalone or the B,4,5,6-tetrabromo analogue thereof in a dyebath containing naphthalene-2-sulfonic acid formaldehyde, sorbitol and water. Other analogues of these dyes containing one or two chlorine and bromine groups in the quinaledine nucleus are also shown.

---

This invention relates to novel 3' - hydroxyquinophthalone dyestuffs and to the use of such dyestuffs in coloring polyester materials. More particularly, this invention relates to halogenated 3' - hydroxyquinophthalones having 4 or more chlorine and/or bromine atoms in the dyestuff molecule and to the use of such dyestuffs in coloring polyester fibers.

Polyester fibers present particular dyeing problems, arising at least in part out of the hydrophobic nature of such fibers. In the dyeing of polyester fibers, the class of dyes known as disperse dyestuffs has come to have the widest application. These dyestuffs are essentially water-insoluble products applied in a finely divided condition from a dispersion. In the application of such dyestuffs, the dyeing difficulties associated with polyester fibers have been met by the development of special methods for the application of disperse dyes to the fibers. Of these methods, the one known as the Pad/Thermofix method has become of increasing importance since it is particularly adapted for high-speed, continuous dyeing operations. In this method, a fabric is padded by passing it through an aqueous suspension of the dyestuff and squeezing the fabric between closely-set rollers in order to remove excess dye liquor. The dyestuff is only loosely attached to the fiber at this point. The dyestuff is then fixed on the fiber by subjecting the material to a short, intensive heat-treatment at elevated temperatures of the order of about 120–220° C. It is evident that a dyestuff, in order to be suitable for application by this method, must be fast to sublimation or else it will wholly or partially volatilize from the fiber during the heat-treatment step. The result of such sublimation will be a loss of color value on the polyester fiber and, if a union dyeing operation is being carried out, the staining of the other fibers, such as cotton, which may be present in the blend.

Among the disperse dyes now available for polyester fibers there are several involving modifications of the 3'-hydroxyquanophthalone molecule. These dyestuffs have poor sublimation fastness and, hence, are not entirely satisfactory for use in the dyeing of polyester fibers. Among the various derivatives of 3'-hydroxyquinophthalone which have been so employed, there may be mentioned the mono- and di-halogeno 3'-hydroxyquinophthalones described in U.S. Patent No. 3,036,876. The sublimation characteristics of these dyestuffs likewise are not completely satisfactory. Hence, the provision of disperse dyestuffs of superior sublimation fastness properties is a matter of continuing concern and investigation in the dyeing field. The present invention makes available to the industry disperse dyestuffs of excellent fastness properties, exhibiting in particular outstanding sublimation fastness.

In accordance with the present invention, it has been found that certain poly halogeno 3' - hydroxyquinophthalones are yellow to orange-yellow dyes providing excellent fastness characteristics on polyester fibers dyed therewith. These dyes are highly insoluble materials which are very readily applicable by the Pad/Thermofix method, providing excellent tinctorial value and strength build-up.

The halogeno 3-hydroxyquinophthalones of the present invention are of the formula:

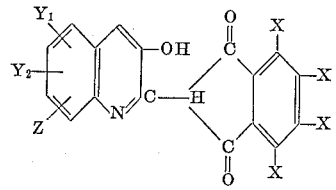

in which X is chlorine or bromine, $Y_1$ and $Y_2$ are hydrogen, chlorine or bromine and Z is hydrogen, methyl, phenyl or substituted phenyl.

The halogenated 3'-hydroxyquinophthalones of the present invention can be obtained by the condensation of a 3-hydroxyquinaldine, containing the substituents $Y_1$, $Y_2$ and Z, having the meaning assigned above, with an appropriately substituted phthalic acid derivative. Thus, tetrachloro- or tetrabromophthalic acid can be employed. There can also be used, instead of the phthalic acid reactant, the corresponding phthalic anhydrides, amides and imides. Instead of 3-hydroxyquinaldine and its derivatives, there can be employed the 3 - hydroxyquinaldine - 4 - carboxylic acids, the carboxylic group being free or forming an internal salt. If the latter are employed, the carboxylic acid group will be split off during the condensation.

The condensation is usually effected at an elevated temperature in a suitable inert solvent. Advantageously, a temperature of the order of about 170–200° C. will be employed with a temperature of 175–180° C. constituting the preferred operating temperature. Representative of the solvents which are employed in the preparation of the compounds of the present invention are chlorinated hydrocarbon solvents, such as o-dichlorobenzene and trichlorobenzene, and substituted aromatic solvent, such as nitrobenzene.

For dyeing, the said dyestuffs are preferably used in a finely divided form and the dyeing is carried out in the presence of a dispersing agent such as sulfite cellulose waste liquor or a synthetic detergent, or a combination of different wetting and dispersing agents. Before dyeing, it is generally of advantage to convert the dyestuff or dyestuffs to be used into a dyestuff preparation which contains a dispersing agent and the finely divided dyestuff(s) in such a form as to yield a fine dispersion when the preparation is diluted with water. Dyestuff preparations of this kind can be made by known methods, for example, by grinding the dyestuff(s) either in dry or wet form with or without the addition of a dispersing agent.

The dyestuffs of the present invention are particularly adapted for dyeing by the so-called thermofixation or Pad/Thermofix method, in which the fabric to be dyed is impregnated advantageously at a temperature not exceeding 60° C. with an aqueous dispersion of the dyestuff, which may contain 1 to 50% of urea and a thickening agent, especially sodium alginate, and the fabric is squeezed in the usual manner. The squeezing is preferably carried out so that the goods retain 50 to 100% of their weight of dye liquor.

The dyestuff is fixed by subjecting the impregnated fabric to a heat treatment at temperatures above 100° C., for example, at a temperature ranging from 120–220° C., it being of advantage to dry the fabric prior to this treatment, for example, in a current of warm air.

The thermofixation mentioned above is of special interest for the dyeing of mixed fabrics of polyester fibers and cellulose fibers, especially cotton. In this case, in addition to the dyestuff to be used in the process of the invention, the padding liquor contains a dyestuff suitable for dyeing cotton, for example, a direct dyestuff or vat dyestuff, or more especially a so-called reactive dyestuff, i.e. a dyestuff capable of being fixed on cellulose fibers with the formation of a chemical bond, for example, a dyestuff containing a chlorotriazine or chlorodiazine residue. In the latter case it is of advantage to add to the padding liquor an agent capable of binding acid, for example, an alkali carbonate, alkali phosphate, alkali borate or alkali perborate, or a mixture of two or more of these agents. When vat dyestuffs are used the padded fabric must be treated, after the heat treatment, with an aqueous alkaline solution of a reducing agent of the kind used in vat dyeing.

The dyeings produced on polyester fibers by the process of the invention are advantageously given an after-treatment, for example, by heating them with an aqueous solution of a non-ionic detergent.

The process is also suitable for dyeing mixed fabrics of polyester fibers and wool and the wool portion which remains reserved, may be subsequently dyed with a wool dyestuff.

Instead of applying the dyestuffs in the process by impregnation, they may be applied by printing. For this purpose, a printing colour is used which in addition to the usual printing assistants such as wetting and thickening agents, contains the finely dispersed dyestuff, if desired, in admixture with one of the aforesaid cotton dyestuffs, and, if desired, in the presence of urea and/or an agent capable of binding acid.

There are obtained by the practice of the present invention strong dyeing or prints having excellent fastness properties, especially a good fastness to sublimation and to light. A further advantage is the good reservation of wool and cotton attained with the dyestuffs used in this process.

The term polyester defines synthetic polymeric polyesters such as the highly polymeric linear polyesters, the molecules of which have recurring monomeric units connected by ester linkages. Dibasic acids, aromatic acids such as terephthalic acid, diphenyl-4,4′-dicarboxylic acid and/or diphenylsulfone - 4,4′ - dicarboxylic acid and dihydroxy compounds, for example, glycols such as ethylene glycol diethylene glycol, triethylene glycol, propylene glycol and/or butylene glycol, as well as other diols, such as 1,4-cyclohexyldiol can be used as the monomers to form the polymeric polyesters. Typical commercial examples of such fibers are Dacron, Terylene, Fortrel, Trevira, Terlanca, Kodel, Vycron, etc. They are disclosed, for example, in U.S. Patent No. 2,901,466 and British Patent Nos. 578,079, 579,462, 588,411, 588,497 and 596,688.

The present invention is, of course, equally applicable to the dyeing of blends of polyester fibers and cellulosic fibers. The latter term includes native cellulose, such as linen or more particularly cotton, as well as regenerated cellulose, such as viscose or cuprammonium rayon.

The following examples illustrate the invention, the parts and percentages being by weight.

Example 1

40 parts of 3-hydroxyquinaldine-4-carboxylic acid, 63 parts of 3,4,5,6-tetrachlorophthalic acid and 600 parts of dichlorobenzene are thoroughly mixed and heated to 110° C. In the course of 2 hours the temperature is raised to 170° C. while stirring the melt and distilling off the water formed. Upon elimination of the water the melt is held at 175–180° C. for a period of 15 hours. The reaction mixture is then permitted to cool to 60° C. and the batch is suction-filtered to yield a cake comprising 3,4,5,6-tetrachloro-3′-hydroxyquinophthalone from which the residual o-dichlorobenzene is removed by steam distillation. The resultant product is washed with water until salt-free and dried at 100° C. The dye, 3,4,5,6-tetrachloro-3′-hydroxyquinophthalone, is obtained in good yield and in the form of yellowish-brown crystals with a chlorine content of 32.9% and a melting point above 350° C.

When dispersed in the usual manner and applied to polyester fibers it yields bright yellow dyeings of excellent sublimation- and light-fastness.

Example 2

The procedure of Example 1 is carried out except that 3-hydroxy-6-bromoquinaldine is employed in place of 3-hydroxyquinaldine-4-carboxylic acid. A dyestuff is obtained having similar properties to that described in Example 1.

Example 3

7.7 parts of 3-hydroxyquinaldine, 25 parts of 3,4,5,6-tetrabromophthalic anhydride and 250 parts of o-dichlorobenzene are heated together to 175° C. over 2 hours and then held for 15 hours at 175–180° C., during which time some water and dichlorobenzene distill from the mixture. The reaction mixture is then permitted to cool to 70° C. and the batch is suction-filtered to yield a cake comprising 3,4,5,6-tetrabromo-3′-hydroxyquinophthalone from which the residual o-dichlorobenzene is removed by steam distillation. After the steam distillation, the cake is washed with 75 parts of petroleum ether applied in 2 portions and dried to yield about 20 parts of 3,4,5,6-tetrabromo-3′-hydroxyquinophthalone in the form of brown crystals with a bromine content of 51% and a melting point above 350° C.

When dispersed in the usual manner and applied to polyester fibers, it yields strong yellow dyeings of excellent sublimation- and light-fastness.

Example 4

The procedure of Example 3 is repeated employing 3-hydroxy-6-chloro-quinaldine-4-carboxylic acid in place of 3-hydroxyquinaldine. A dyestuff is obtained having properties similar to that described in Example 3.

Example 5

27 parts of 3-hydroxy-6,8-dichloro-quinaldine-4-carboxylic acid (obtained by condensing 5,7-dichloro-isatin with chloracetone according to the method of Berlingozzi and Capuano, Atti R. Accad. Lincei, V, 33. II. 92), 30 parts of tetrachlorophthalic anhydride and 130 parts of o-dichlorobenzene are thoroughly mixed and heated to 120° C. In the course of 2 hours the temperature is raised to 170° C. while stirring the melt and distilling off the water formed. Upon elimination of the water, the melt is held at 175–180° C. for a period of 15 hours. The reaction mixture is then permitted to cool to 60° C. and the batch is suction-filtered to yield a cake comprising 3′-hydroxy-3,4,5,6,6′,8′-hexachloro-quinophthalone from which the residual o-dichlorobenzene is removed by steam distillation. The resultant product is washed with water until salt-free and dried at 100° C. The dye is obtained in 88% yield in the form of greenish-yellow crystals having a chlorine content of 41%.

Example 6

10 parts of the dyestuff of Example 1 are brought to a state of fine dispersion by milling in a ball mill with 2.5 parts of the condensation product of naphthalene-2-sulfonic acid with formaldehyde, 7.5 parts of sorbitol (other polyalcohols can also be employed), and 30 parts of water.

An amount of this preparation sufficient to provide a concentration of 3 grams of dyestuff per liter of dye bath is finely dispersed in water containing 0.5 g. of sodium alginate per liter and the resultant pad liquor is brought to a temperature of 25° C.

A polyester fabric from ethylene glycol and terephthalic acid is then padded with the above liquor and mechanically squeezed to a 65% pick up. The padded material is then air dried and developed by dry heat curing for 1 minute at 200° C. The dyed fabric is then cold rinsed, scoured and finally dried. A bright yellow dyeing is obtained having very good light- and wash-fastness and excellent fastness to sublimation.

The above procedure is repeated with each of the dyestuffs from Examples 2 to 5, employing the same proportions of materials and the same conditions of application. In each instance desirable yellow dyeings of outstanding fastness to sublimation are obtained.

What is claimed is:

1. A process of dyeing and printing a synthetic polyester material which comprises applying to fibrous materials of synthetic polyester an aqueous dispersion containing a halogeno 3'-hydroxyquinophthalone of the formula:

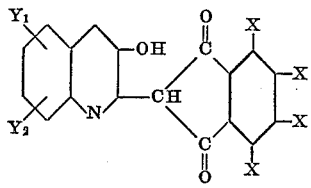

in which X is a member selected from the group consisting of chlorine and bromine and in which $Y_1$ and $Y_2$ are each a member selected from the group consisting of hydrogen, chlorine and bromine, as the essential color imparting substance.

2. Polyester fibers dyed with a halogeno 3'-hydroxyquinophthalone of the formula:

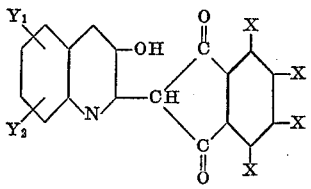

in which X is a member selected from the group consisting of chlorine and bromine and in which $Y_1$ and $Y_2$ are each a member selected from the group consisting of hydrogen, chlorine and bromine.

3. Polyethylene terephthalate fibers dyed with a halogeno 3'-hydroxyquinophthalone of the formula:

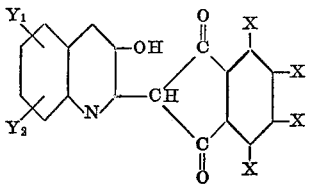

in which X is a member selected from the group consisting of chlorine and bromine and in which $Y_1$ and $Y_2$ are each a member selected from the group consisting of hydrogen, chlorine and bromine.

4. Polyethylene terephthalate fibers dyed with a halogeno 3'-hydroxyquinophthalone of the formula:

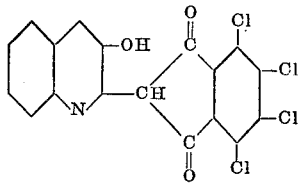

5. Polyethylene terephthalate fibers dyed with a halogeno 3'-hydroxyquinophthalone of the formula:

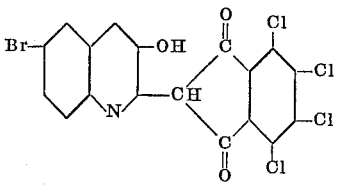

6. Polyethylene terephthalate fibers dyed with a halogeno 3'-hydroxyquinophthalone of the formula:

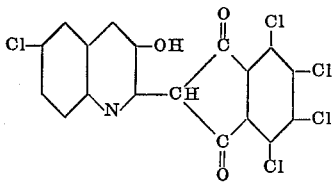

7. Polyethylene terephthalate fibers dyed with a halogeno 3'-hydroxyquinophthalone of the formula:

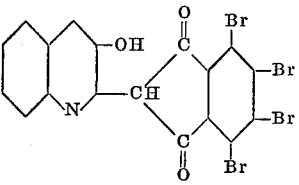

8. Polyethylene terephthalate fibers dyed with a halogeno 3'-hydroxyquinophthalone of the formula:

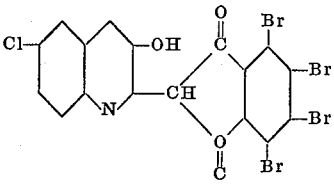

References Cited

UNITED STATES PATENTS 3,036,876    5/1962    Schoellig _____ 8—55

NORMAN G. TORCHIN, *Primary Examiner.*

D. LEVY, *Assistant Examiner.*

UNITED STATES PATENT OFFICE
CERTIFICATE OF CORRECTION

Patent No. 3,399,028                                               August 27, 1968

Hugo Illy

It is certified that error appears in the above identified patent and that said Letters Patent are hereby corrected as shown below:

Column 6,        lines 46 to 53, the right-hand portion of the formula should appear as shown below:

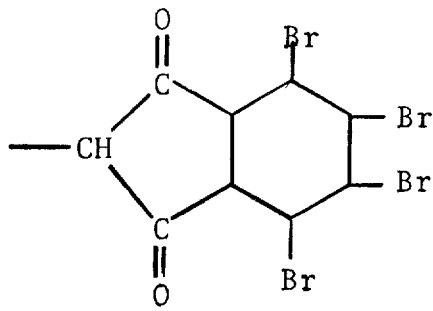

Signed and sealed this 24th day of February 1970.

(SEAL)
Attest:

EDWARD M. FLETCHER, JR.                    WILLIAM E. SCHUYLER, JR.
Attesting Officer                               Commissioner of Patents